(12) United States Patent
Pharn

(10) Patent No.: US 8,965,268 B2
(45) Date of Patent: Feb. 24, 2015

(54) BROADCASTING AND RECEIVING EMERGENCY ALERTS

(71) Applicant: Abroadcasting Company, Huntington Beach, CA (US)

(72) Inventor: Art Pharn, Huntington Beach, CA (US)

(73) Assignee: Abroadcasting Company, Huntington Beach, CA (US)

( * ) Notice: Subject to any disclaimer, the term of this patent is extended or adjusted under 35 U.S.C. 154(b) by 142 days.

(21) Appl. No.: 13/765,547

(22) Filed: Feb. 12, 2013

(65) Prior Publication Data

US 2013/0210340 A1 Aug. 15, 2013

Related U.S. Application Data

(60) Provisional application No. 61/598,801, filed on Feb. 14, 2012.

(51) Int. Cl.
| | |
|---|---|
| *H04H 20/59* | (2008.01) |
| *H04N 21/81* | (2011.01) |
| *H04N 21/45* | (2011.01) |
| *H04N 21/488* | (2011.01) |

(52) U.S. Cl.
CPC ............. *H04H 20/59* (2013.01); *H04N 21/814* (2013.01); *H04N 21/4524* (2013.01); *H04N 21/4882* (2013.01)
USPC .................... 455/3.01; 455/404.1; 455/414.2; 455/567; 340/539.13

(58) Field of Classification Search
CPC ....... H04H 20/59; H04H 20/53; H04H 20/55; H04H 20/57; H04H 20/61; H04H 20/62; H04H 20/63; H04H 20/65; H04H 20/67; H04H 20/71; H04H 20/74; H04H 40/00; H04H 40/09; H04H 40/36; H04H 40/45
USPC ........ 455/3.01, 3.02, 3.06, 404.1, 410, 412.1, 455/412.2, 414.3, 512, 567, 404.2, 466; 370/252, 328; 340/539.13, 539.1
See application file for complete search history.

(56) References Cited

U.S. PATENT DOCUMENTS

| | | | |
|---|---|---|---|
| 8,165,519 B2 * | 4/2012 | Sato et al. ................... 455/3.01 |
| 8,624,727 B2 * | 1/2014 | Saigh et al. ............. 340/539.13 |
| 2002/0166123 A1 * | 11/2002 | Schrader et al. ................ 725/58 |
| 2010/0151782 A1 * | 6/2010 | Sato et al. ................... 455/3.01 |
| 2011/0037590 A1 * | 2/2011 | Kannan ................... 340/539.13 |
| 2011/0195729 A1 * | 8/2011 | Amoroso et al. ............ 455/466 |
| 2013/0041590 A1 * | 2/2013 | Burich et al. .................. 702/19 |
| 2013/0183924 A1 * | 7/2013 | Saigh et al. ................ 455/404.2 |

* cited by examiner

*Primary Examiner* — Tan Trinh
(74) *Attorney, Agent, or Firm* — Knobbe, Martens, Olson & Bear, LLP

(57) ABSTRACT

A device can receive an alert marker corresponding to an alert for broadcast programming content. The apparatus can further broadcast the programming content on one radio broadcast channel and broadcast the alert content of the alert on another broadcast channel. Based on the alert marker, the device can change the channel from the broadcast channel with the programming content to the broadcast channel with the alert content. The apparatus can also remove portions of broadcast programming content and replace it with the alert content.

20 Claims, 12 Drawing Sheets

| | | |
|---|---|---|
| 602 | Starter Synchronizer | 128 bits |
| 604 | Size | 32 bits |
| 606 | Digital Signature | 128 bits |
| 608 | Originator ID | 32 bits |
| 610 | Alert ID | 64 bits |
| 612 | Alert Priority Level | 64 bits |
| 614 | Alert Category | 64 bits |
| 616 | Latitude/Longitude | 64 bits |
| 618 | Alert Coverage | 64 bits |
| 620 | Payload Location | 32 bits |
| 622 | Payload Format | 32 bits |
| 624 | Start Timestamp | 64 bits |
| 626 | Stop Timestamp | 64 bits |
| 628 | Repetition | 32 bits |
| 630 | Time-to-Live | 32 bits |
| 632 | Ender Synchronizer | 128 bits |

FIG. 6

BROADCASTING AND RECEIVING EMERGENCY ALERTS

CROSS-REFERENCE TO RELATED APPLICATIONS

The present application claims priority under 35 U.S.C. §119(e) to U.S. Provisional Application No. 61/598,801, filed on Feb. 14, 2012, which is hereby incorporated by reference in its entirety.

BACKGROUND OF THE INVENTION

1. Field of the Invention

The present invention relates to Emergency Alert System (EAS), targeted local alert, analog/digital radio transmitter/receiver, TV transmitter/receiver, computer and Internet devices.

2. Description of the Related Art

Current Emergency Alert System (EAS) transmits an alert to all over-the-air TV and radio channels, cable television channels, wireless cable systems, satellite digital audio radio service (SDARS) channels, direct broadcast satellite (DBS) channels and wireline video service channels to alert as many people as possible. The EAS system allows the President to address the American public during national emergency. Along with its capability of providing an emergency message to the entire nation simultaneously, the EAS allows authorized state and local authorities to quickly distribute important local emergency information, such as AMBER alerts and emergency weather information targeted to a specific area.

The EAS is rarely used but must be ready at all times. The current EAS system has many issues. A) It requires constant tests and exercises to ensure the system operational Readiness. The exercising is troublesome and costly to broadcasters. It inconveniences the public. B) An EAS alert interrupts regular broadcast programming and therefore is sparingly used to only address the public in case of an extreme emergency. C) The EAS system does not provide a mechanism that allows public to filter which alert to receive or to not receive. Therefore, the EAS system is underutilized and used for extreme emergency cases only. D) The EAS system inefficiently uses broadcast frequencies. It transmits an alert in every broadcast frequency. E) The EAS system lacks an ability to control the alert's delivery at an individual level. The minimum distribution area is usually in the range of one hundred miles.

SUMMARY

The invention provides an emergency alert system that ensures system operational readiness without exercising alerts, does not interrupt regular broadcast programming, allows options for public to filter alerts, efficiently uses broadcast frequencies by eliminating unnecessary simulcasts of the same medium, and enables fine detail targeted alert at individual level. The invention describes the equipment for broadcasting and receiving such alert. The invention provides an enhanced breadth of emergency alert broadcasting to HD Radio broadcast transmitter and receiving to HD Radio broadcast receiver.

In certain embodiments, a method is provided that includes receiving broadcast content for a first radio channel of a radio receiver; causing an auditory device to present the broadcast content to a user; receiving an alert marker in the broadcast content indicating a type of alert and a coverage area of the alert; and determining whether the alert is relevant to the user based at least on the type of alert and the coverage area. Upon determining that the alert is not relevant to the user, the auditory device continues to present the broadcast content to the user on the first radio channel. Upon determining that the alert is relevant to the user, the method further includes automatically changing the radio receiver to a second radio channel, receiving alert content for the second radio channel, causing the auditory device to present the alert content to the user on the second radio channel, determining an end of the alert content, and automatically changing the radio receiver to the first radio channel upon determining the end of the alert content.

In some embodiments a method is provided that includes receiving broadcast content for a first channel of a receiver; receiving an alert marker indicating a type of alert and a coverage area of the alert; determining, using one or more computer processors, that the alert is relevant to a user based at least on the type of alert and the coverage area; automatically changing the receiver to a second channel upon determining that the alert is relevant to the user; receiving alert content for the second radio channel; determining an end of the alert content; and automatically changing the receiver to the first channel upon determining the end of the alert content.

In certain embodiments a device is provided that includes an antenna, a tuner, a decoder, and one or more computer processors. The antenna can be configured to receive broadcast content for at least a first channel and receive alert content for at least a second channel. The tuner can be configured to select a channel from a plurality of channels from which to provide content to a user. The decoder can be configured to decode at least a portion of an alert marker received in the broadcast content and to determine a type of an alert and a coverage area of the alert. The one or more computer processors can be configured to determine that the alert is relevant to a user based at least on the type of alert and the coverage area, automatically cause the tuner to select the second channel upon determining that the alert is relevant to the user, determine an end of the alert content, and automatically cause the tuner to select the first channel upon determining the end of the alert content.

In some embodiments, a method is provided that includes receiving broadcast content for a first channel of a receiver; receiving alert content for broadcast on the first channel; inserting an alert marker into the broadcast content; transmitting the broadcast content with the inserted alert marker to the first channel of the receiver; and transmitting the alert content to a second channel of the receiver.

In certain embodiments, a method is provided that includes receiving broadcast content for a first radio channel of a radio receiver; causing an auditory device to present the broadcast content to a user; receiving an alert marker in the broadcast content indicating a type of alert and a coverage area of the alert; and receiving alert content for the first radio channel; determining whether the alert is relevant to the user based at least on the type of alert and the coverage area. Upon determining that the alert is relevant to the user, the auditory device can present the alert content to the user on the first radio channel. Upon determining that the alert is not relevant to the user, the method can further include automatically changing to a second radio channel of the radio receiver, processing the broadcast content for the second radio channel, causing the auditory device to present the broadcast content to the user on the second radio channel, determining an end of the alert content on the first radio channel, and automatically changing the radio receiver to the first radio channel upon determining the end of the alert content.

In some embodiments, a method is provided that includes receiving broadcast content for a first channel of a receiver; receiving an alert marker in the broadcast content indicating a type of alert and a coverage area of the alert; receiving alert content for the first channel; determining that that the alert is not relevant to the user; automatically changing the receiver to a second channel of the receiver upon determining that the alert is not relevant to the user; processing the broadcast content for the second channel; determining an end of the alert content on the first channel; and automatically changing the receiver to the first channel upon determining the end of the alert content.

In certain embodiments, a receiver is provided that includes an antenna configured to receive broadcast content and alert content for a first channel of the receiver; a tuner configured to select a channel from a plurality of channels from which to provide content to a user; a decoder configured to decode at least a portion of an alert marker received in the broadcast content of a first channel and to determine a type of an alert and a coverage area of the alert; and one or more computer processors. The one or more computer processors can be configured to determine that the alert is not relevant to a user based at least on the type of alert and the coverage area, automatically cause the tuner to select a second channel upon determining that the alert is not relevant to the user, process the broadcast content for the second channel; determine an end of the alert content on the first channel; and automatically cause the tuner to select the first channel upon determining the end of the alert content.

In some embodiments, a method is provided that includes receiving broadcast content for a first channel of a receiver; receiving alert content for broadcast on the first channel; inserting an alert marker into the broadcast content; transmitting the broadcast content with the alert marker to the first channel of the receiver; following transmission of the broadcast content with the alert marker, transmitting the alert content to the first channel of the receiver; during transmission of the alert content to the first channel, transmitting the broadcast content to a second channel of the receiver; and following transmission of the alert content, transmitting the broadcast content to the first channel of the receiver.

BRIEF DESCRIPTION OF THE DRAWINGS

FIG. 6 shows an exemplary format of an alert.

DETAILED DESCRIPTION

Figure 1:
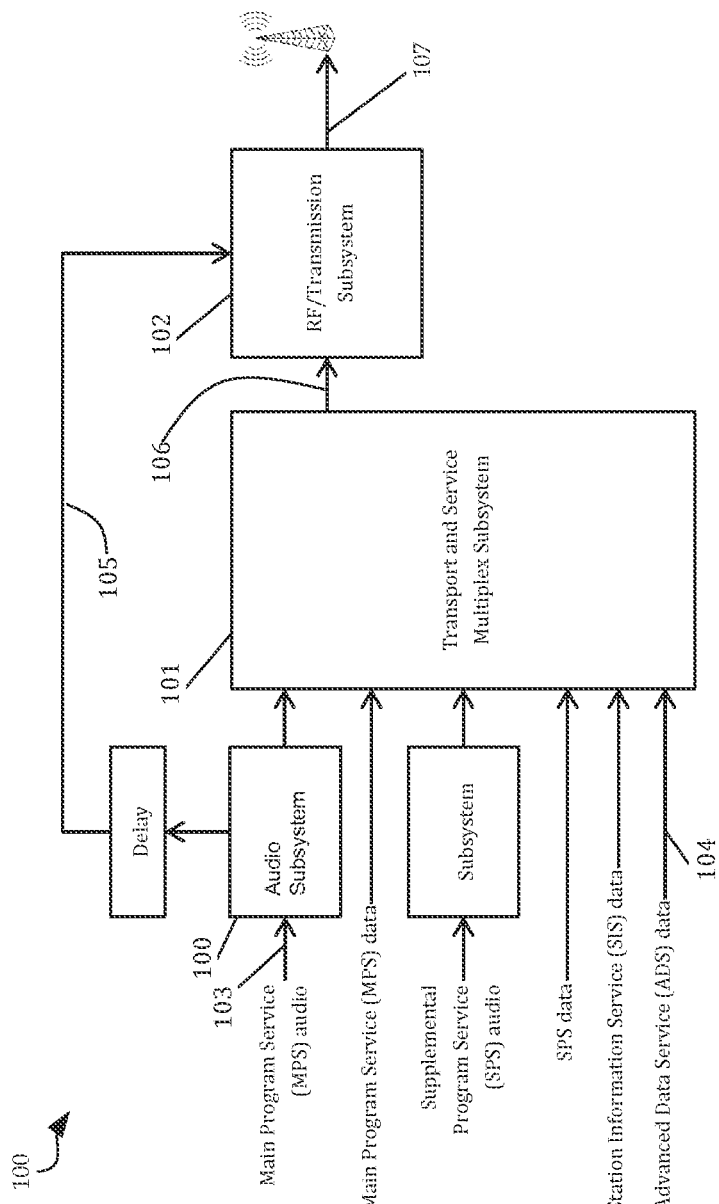
FIG. 1 illustrates the three major subsystems of the HD Radio system specified by NRSC-5.

FIG. 1 illustrates three major subsystems of an HD Radio system 100 specified by NRSC-5. The major subsystems include a RF/transmission Subsystem 102, Audio Subsystem 100 and Transport and Service Multiplex Subsystem 101, which has Advanced Data Service (ADS) data 104 as one of its input. Audio 103 is the main broadcast programming content that is transmitted in both analog audio signal 105 and digital analog audio signal 106. An EAS alert is inserted into the main broadcast signal 103. The alert appears on both analog signal 105 and digital signal 106 which are blended together to create HD Radio broadcast signal 107 in either FM band or AM band.

Figure 2:
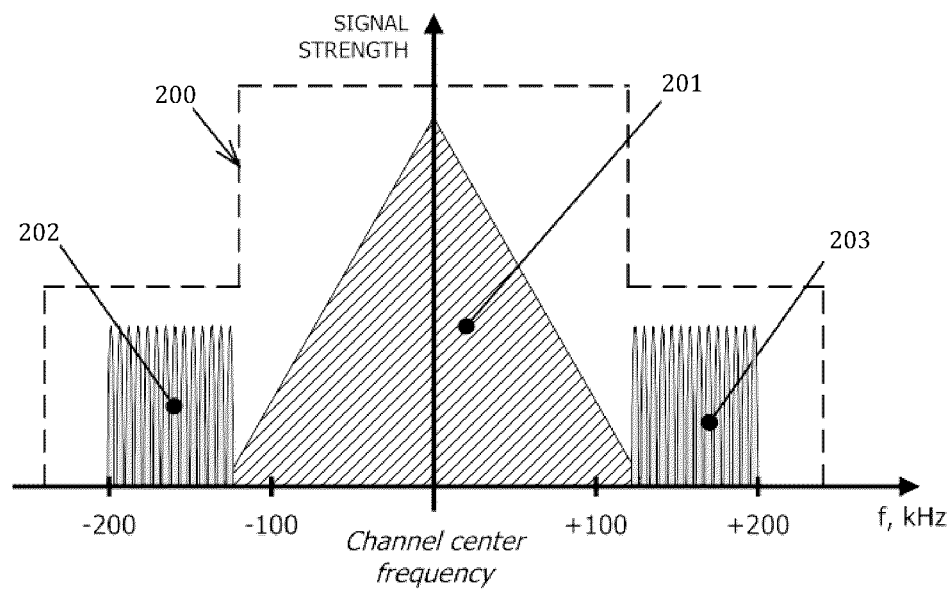
FIG. 2 illustrates the insertion of a digital signal along with an analog signal in the FM band.
Figure 3:
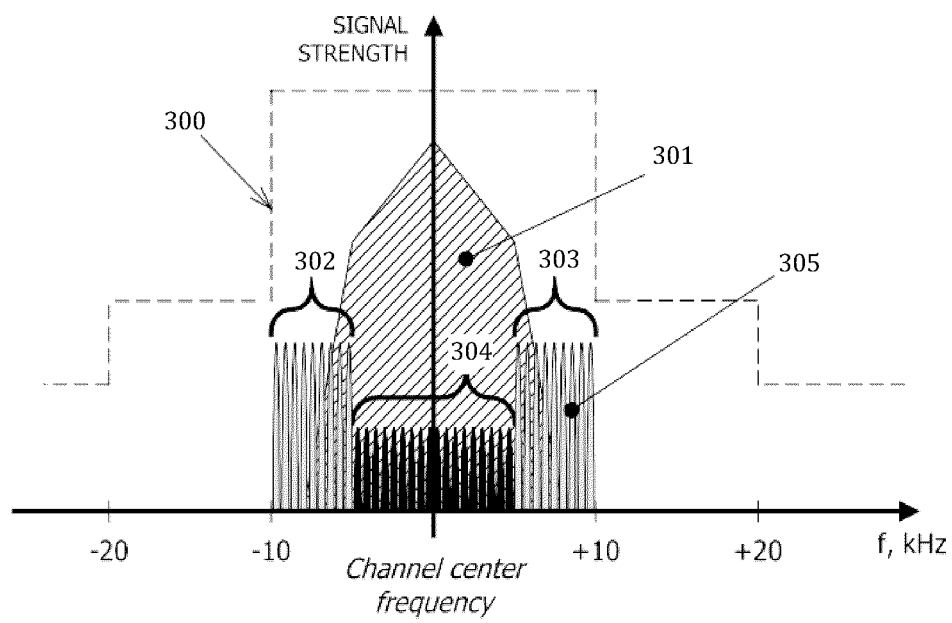
FIG. 3 illustrates the insertion of a digital signal along with an analog signal in the AM band.

HD Radio standard specifies that a broadcaster fits in a digital signal along with the analog signal being broadcast, within the current spectrum allocation, and without causing undue harm to the existing analog signals. FIG. 2 and FIG. 3 illustrate the methods for doing this for FM band and AM band radio signals, respectively. In FM band case, Digital Carrier 202, 203 are placed next to the existing Analog FM Signal 201. In AM band case, Digital Carriers 305 composes of Group 302, 303 and 304 which are placed below the existing Analog Signal 301. Mask 200, 300 are the FCC RF spectrum occupancy limitations.

Figure 4:
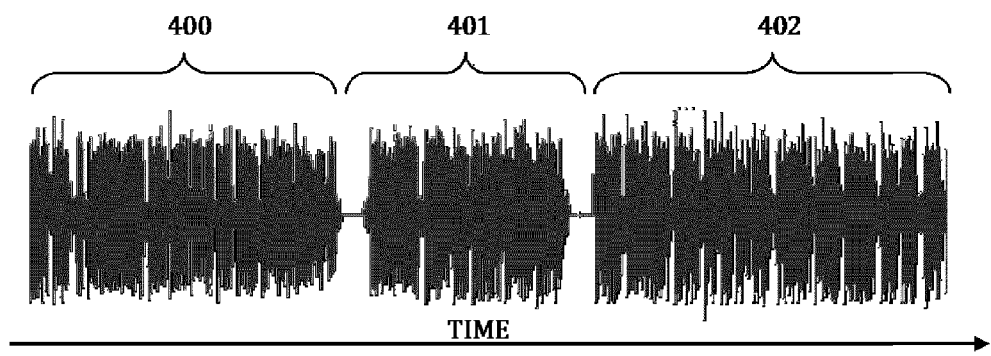
FIG. 4 illustrates the addition of an alert between two broadcast programming segments.

FIG. 4 illustrates the addition of an alert 401 between two broadcast programming segments. The Alert 401 is added in between two broadcast programming segment 400 and 402. This addition is done at every participating broadcast station. The process is repeated again at every station such that the same alert is transmitted out on every participating broadcast channel.

Receiving Alert by Channel Switching

According to some embodiments, instead of adding an EAS alert 401 into broadcast programming content 400, 402, an Alert Marker can be inserted without interrupting normal broadcast programming at the broadcaster side. An alert from an Alert Marker can be rendered at the receiver side as well.

At the broadcaster side, a method comprises receiving a digital or analog Alert Marker and digital or analog alert content from a server through one or more communication networks such as satellite, microwave, radio wave and Internet. The method also comprises inserting an Alert Marker into a normal HD Radio broadcast programming content. The method also comprises broadcasting HD Radio broadcast programming content with an Alert Marker on one HD radio broadcast channel and transmitting the actual alert content on another radio HD broadcast channel.

In some embodiments, a broadcast transmitter replaces the real alert with an Alert Marker, which is smaller than the real alert. The Alert Marker can be digital data, invisible light or invisible tone. It can be sent through the Advanced Data Services (ADS) 104 which is specified by the National Radio Systems Committee (NRSC) standard. Because of the marker's insignificant size or its invisible wavelength or its invisible audio frequency outside of human hearing range, the marker can be inserted without effecting normal broadcast programming.

Figure 5:
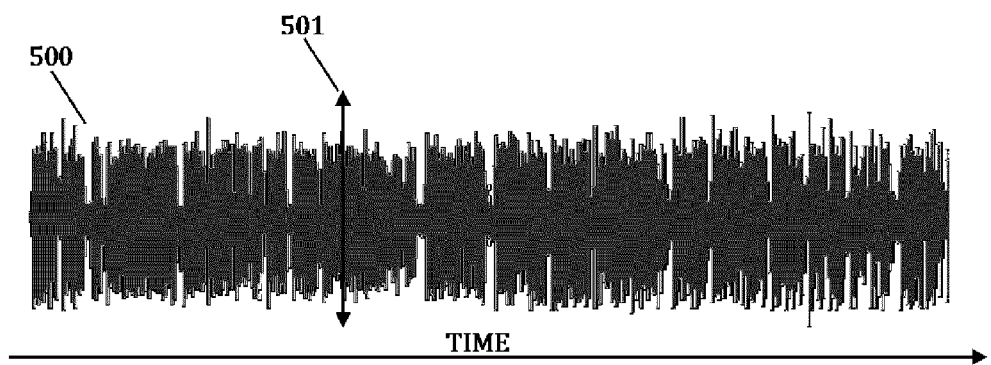
FIG. 5 illustrates an alert that is inserted into broadcast programming content.

FIG. 5 illustrates an Alert Marker 501 that is inserted into broadcast programming content 500. An Alert Marker 501 may contain information about a location of an alert and a type of the alert. In addition, it may contain other information such as coverage area, effectees (person that may be effected by an alert), effective time and duration period, and source of the alert. A coverage area can be specified as GPS coordinates with coverage radius, a city name, a street name, a zip code. An effectee be may a person or an object that an alert is targeting. Example of effectees are male, female, adult, child, infant, teen, senior, pet, dog, cat, small animal, house, boat, car, electronic equipment, etc.

FIG. 6 shows an exemplary format of an Alert Marker 600. Although described with a particular number of bits, it will be understood that the various components of the Alert Marker 600 can be any size as desired.

The 128-bit Starter Synchronizer 602 and 128-bit Ender Synchronizer 632 can be a Global Unique Identifier (GUID), which can be used as a synchronizer during the decoding process of an Alert Marker. Both Synchronizer numbers can have different values. For example, the Starter Synchronizer 602 can be used to locate the beginning of the stream and to reset the receiver, and the Ender Synchronizer 632 can be used to locate the end of the stream and to reset the receiver.

The 32-bit Size 604 represents the size of the Alert or alert content. Depending on the type of an Alert, the Size 604 can be in the unit of bytes or time such as second.

The 128-bit Digital Signature 606 can be used to authenticate the Alert Marker 600 against forgery or tampering. Each alert originator can have its own signature. This Digital Signature 606 can be the same digital signature commonly used in financial transactions. Additionally, smart card or hardware token can be used along with Digital Signature to provide additional security.

The 32-bit Originator ID 608 can be used in addition to the Digital Signature 606 to identify more detail about the originator. For example, the Originator ID 608 can indicate the identity of the entity that issues an alert.

The 64-bit Alert ID 610 can be used to identify an alert or to overwrite, correct or cancel a previous alert.

The 64-bit Alert Priority Level 612 and 64 bit Alert Category 614 can be used together to describe different types of alerts, including Test Alert, Update Alert, Cancellation Alert, etc. The Alert Priority Level 612 can also be used to resolve conflicts. For example, Alerts with higher priority can overwrite alerts with lower priority. The Alert Category 614 can also be used to filter out specific types of alert by the secondary broadcaster and/or an end-user's receiver. The system can accommodate national alerts and well as variety of local alerts such as Amber Alert, traffic alert, traffic accident alert, 911 alert, power outage alert etc.

The 64-bit Latitude/Longitude number 616 can be used to specify the epicenter of an emergency or warning. The Latitude/Longitude 616 can also be used in conjunction of the Alert Type to filter out an alert. For example, an Amber Alert goes to end-user who is in the immediate vicinity and who allows Amber Alert. In some embodiments, zero coordinate matches all (everywhere).

The 64-bit Alert Coverage 618 can be used to specify the area affected by an alert. For example, it can represent radius of a circular area from the Latitude/Longitude 616 number, a city, state, zip code, unique street name (with city and state names), river, mountain, freeway, tourist attraction, building, airport, bus station, train station, etc.

The 32-bit Payload Location 620 and 32-bit Payload Format 622 can be used to expand type of supported media beyond NRSC's HD Radio standard. The Payload Format 622 can indicate the format of the alert payload. In some embodiments, the Payload Format 622 can indicate the HD Radio channel that is currently broadcasting the alert. In certain embodiments HD Radios can automatically tune to this channel and switch back to the regular channel that the end-user was listening to. This switch back process can be controlled by the value of the first bit of Payload Location 620 called Switch-Back bit. For example, if it is '1', the switch back process will happen. If it is '0', the switch back process will not happen and another alert is expected to follow. The Switch-Back bit can also be used in a live broadcasting alert where its duration is unknown. Such alert can be divided into a smaller alert with a specific duration.

The 64-bit Start Timestamp 624 and 32-bit Stop Timestamp 626 can be used to specify the starting time of an alert which can be repeated as many time as possible (which can be 0) until the stop time.

The 32-bit Repetition number (not shown) can be used to specify how many times an alert should be repeated. The interval between each repetition can be encoded within this value as well. For example, the number of repetition can be encoded as the upper 16-bit part and the interval period in minutes can be encoded as the 16-bit lower part.

The 32-bit Time-to-Live 630 (TTL) can be used to limit the lifespan of an alert. Each time an alert is passed from one source to another, the TTL number 630 is decrement. If it reaches zero, the alert is discarded.

At the receiver side, according to another exemplary embodiment, a HD radio broadcast receiver for rendering an alert from an Alert Marker is provided. The HD Radio broadcast receiver comprises a user interface, a processing system, and a tuner. The user interface comprises an input system for allowing user to select types of alerts to be rendered. The processing system detects data corresponding to an alert within broadcast signal, determines whether the alert satisfies a condition for rendering, and if condition is satisfied, determines the time and broadcast channel where the corresponding alert can be found, causes the tuner to switch channel to said channel at said time, switches channel back to the previous channel after the completion on the alert.

Figure 7:
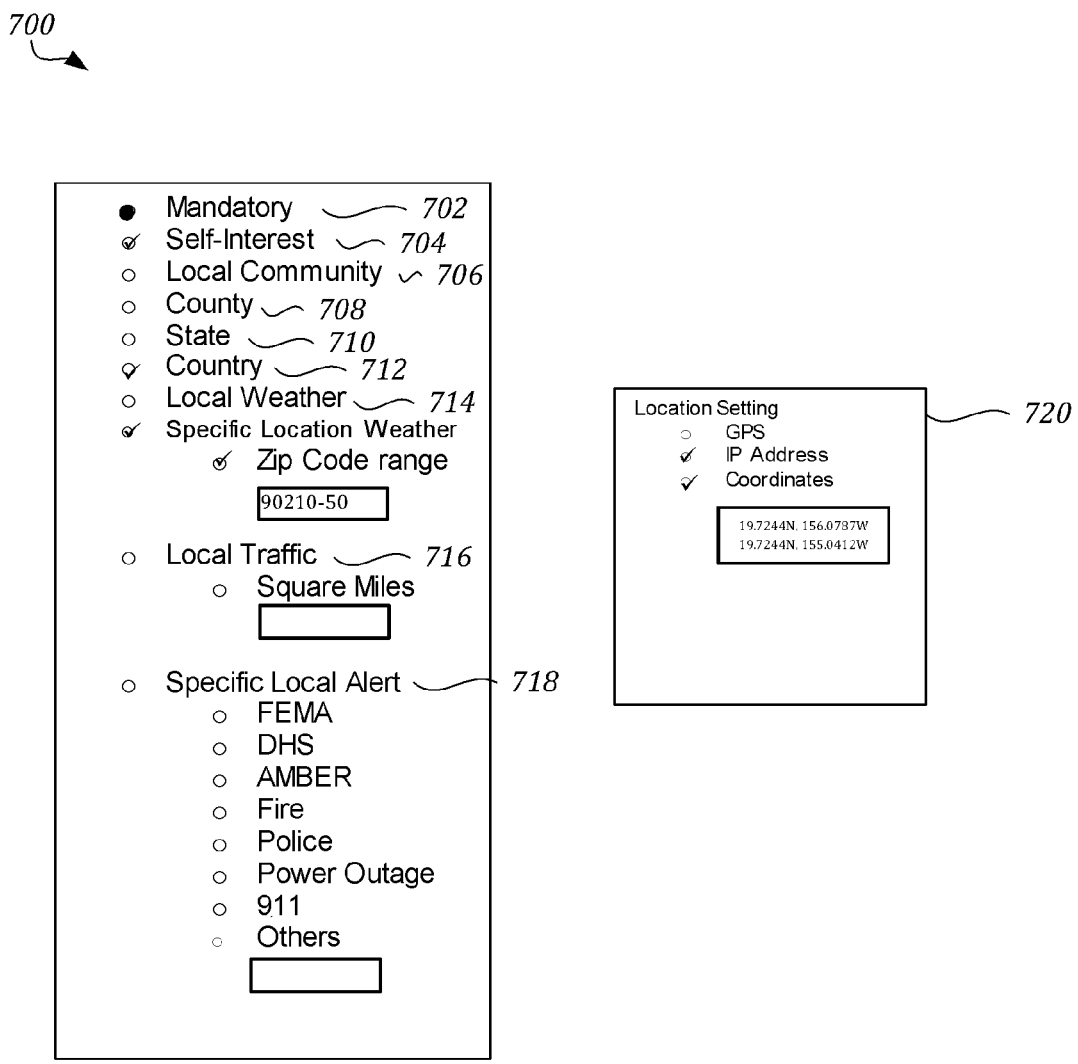
FIG. 7 illustrates an exemplary embodiment of a user interface to select preferences for rendering an alert if a condition is satisfied.

FIG. 7 illustrates an exemplary embodiment of a user interface 700 to select preferences for rendering an alert if one of the conditions is satisfied. In some embodiments, mandatory settings 702 can be forced upon a user such that a user must receive the alert. Examples of mandatory alerts are an alert from the President or an alert from Emergency Alert System (EAS).

Self-Interest setting 704 can specify an alert that can affect a user at an individual level based on certain criteria such as home addresses, work address, current physical location, other given location such as a personal property location, spouse's work location, and children's school location, etc.

Local Community setting 706 can specify a user's resident community which is larger than a single property or a city but smaller than a county. County 708, State 710 and Country 712 settings can specify a county such as Los Angeles, a state such as California and country such as USA within user's specified Location Setting.

Local Weather setting 714 can specify a weather alert in a specific area around user's location. In addition, a user can specify Zip Code as alert's area of interest.

Local Traffic setting 716 can specify local traffic alert that is within a specific coverage area around user's location.

Other specific types of alerts 718, such as, but not limited to, Federal Emergency Management Agency (FEMA), Department of Homeland Security (DHS), American's Missing Broadcast Emergency Response (AMBER), Fire, Police, Power Outage, 911 can be specified. In addition, other types of alerts can be specified by a specific alert ID or code.

Location Setting 720 can be used to specify an alert's area of interest. It can be based on user's current location or others obtained from GPS, IP Address, and entered coordinates.

According to another exemplary embodiment, a HD Radio broadcast receiver for repeatedly rendering an alert from an Alert Marker is provided. The broadcast receiver comprises a user interface, a processing system, memory storage component and a tuner. The user interface comprises an input system for allowing user to select types of alerts which are to be rendered. It can specify how to acknowledge that the user has been notified. The acknowledgement can be carried through the Internet, email, texting. The processing system detects data corresponding to an alert within broadcast signal, determines whether the alert satisfies a condition for rendering, and if condition is satisfied, determines the starting time, stop time, number of repetition of the alert and corresponding broadcast channel where the alert can be found, causes the tuner to switch channel to said channel at said start time to receive the actual alert, switches channel back to the original channel after the completion on the alert, repeat the alert again until said stop time or number of repetition has been satisfied.

Figure 8:
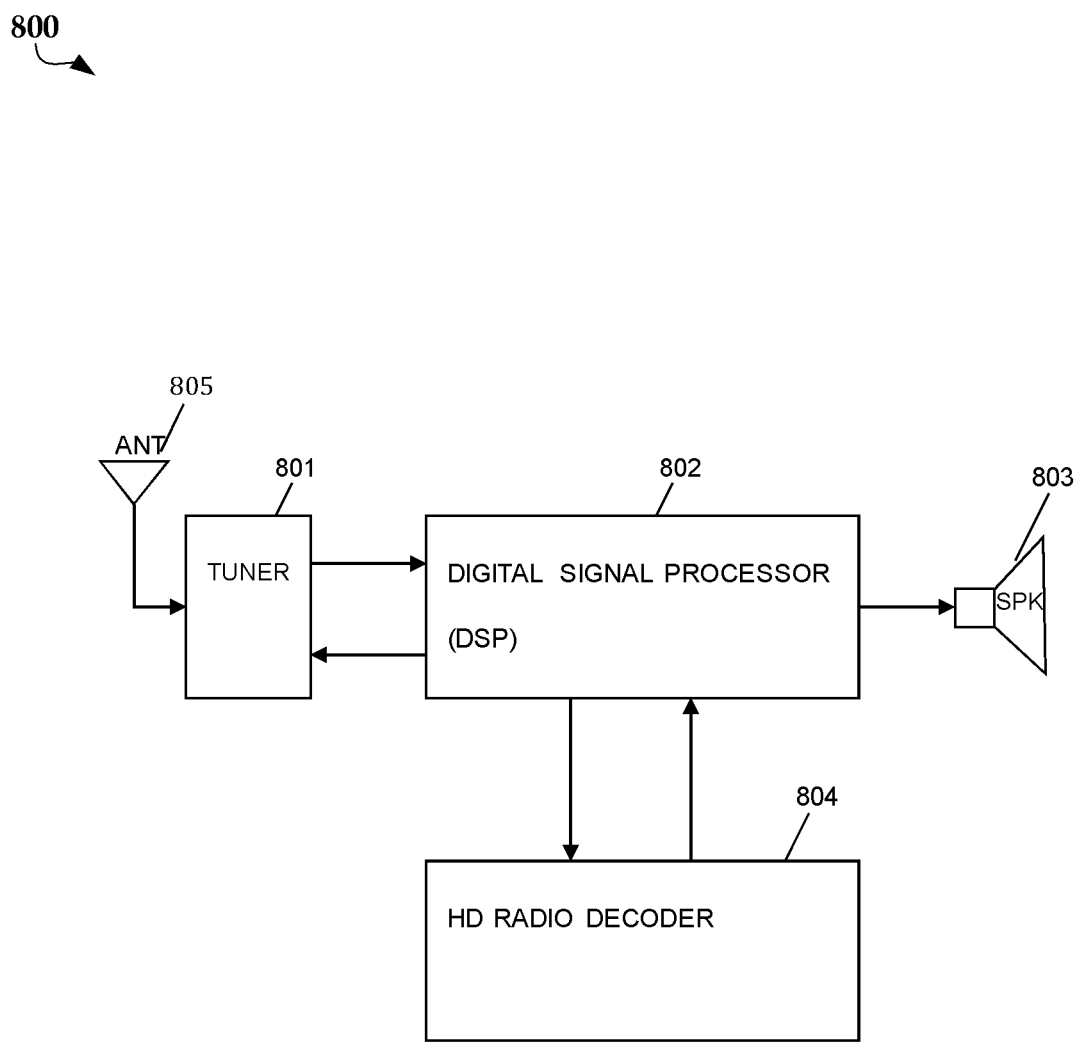
FIG. 8 illustrates an exemplary embodiment of a broadcast receiver, such as HD Radio receiver.

FIG. 8 illustrates an exemplary embodiment of a broadcast receiver 800, such as HD Radio receiver. Tuner 801 receives broadcast signal from antenna 805 and sends it to a DSP 802. DSP 802 processes and sends it to Decoder 804 which decodes and returns it to DSP 802. DSP 802 sends it to Speaker 803. When the Decoder 804 detects an Alert Marker, it returns information about the Alert Marker back to DSP 802. The DSP 802 determines if the Alert Marker satisfies a condition for rendering. If the condition is satisfied, DSP 802 instructs Tuner 801 to switch channel to receive the alert at the appropriate time specified in an Alert Marker. After the completion of the alert, DSP 802 instructs Tuner 801 to switch back to receiving broadcast programming from the previous broadcast channel. DSP 802 can record or store the alert for further use. The DSP 802 can repeat the alert at a specific interval for a specific time or for a specific number of times. Upon receiving new information from another Alert Marker, DSP 802 can cancel or repeat a specific alert stored earlier.

Figure 9:
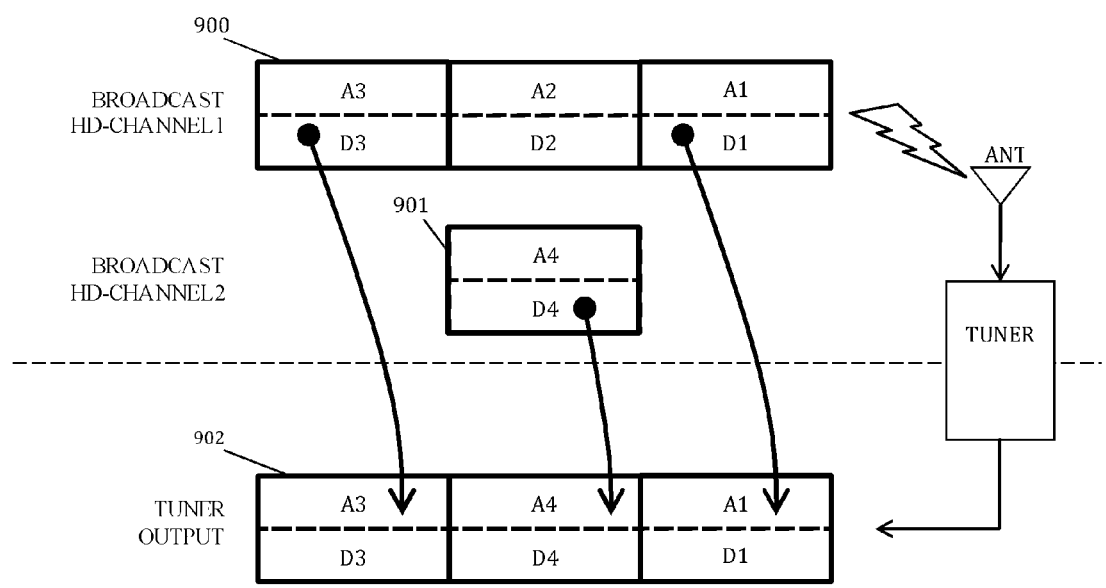
FIG. 9 illustrates a tuner switching from one normal content to an alert content, when a condition for rendering an alert is satisfied.

FIG. 9 illustrates Tuner 801 switching channel from HD-Channel-1 900, normal broadcast content, to HD-Channel-2 901, an alert content, when a condition for rendering an alert is satisfied. Later, Tuner 801 switches channel from HD-Channel-2 901 back to HD-Channel-1 900 after the end of the alert. As illustrated, at time 1, the tuner output 902 includes data A3, D3 from HD-Channel-1 900. At time 2, the receiver detects the alert marker, and the Tuner 801 changes to HD-Channel-2 901. At time 2, the tuner output 902 includes A4, D4 from HD-Channel-2 901 instead of A2, D2 from HD-Channel-1 900. After the alert content is completed at time 3, the tuner 801 switches back to HD-Channel-1 900 and the tuner output 902 includes the data from HD-Channel-1 900 (A1, D1).

Figure 10:
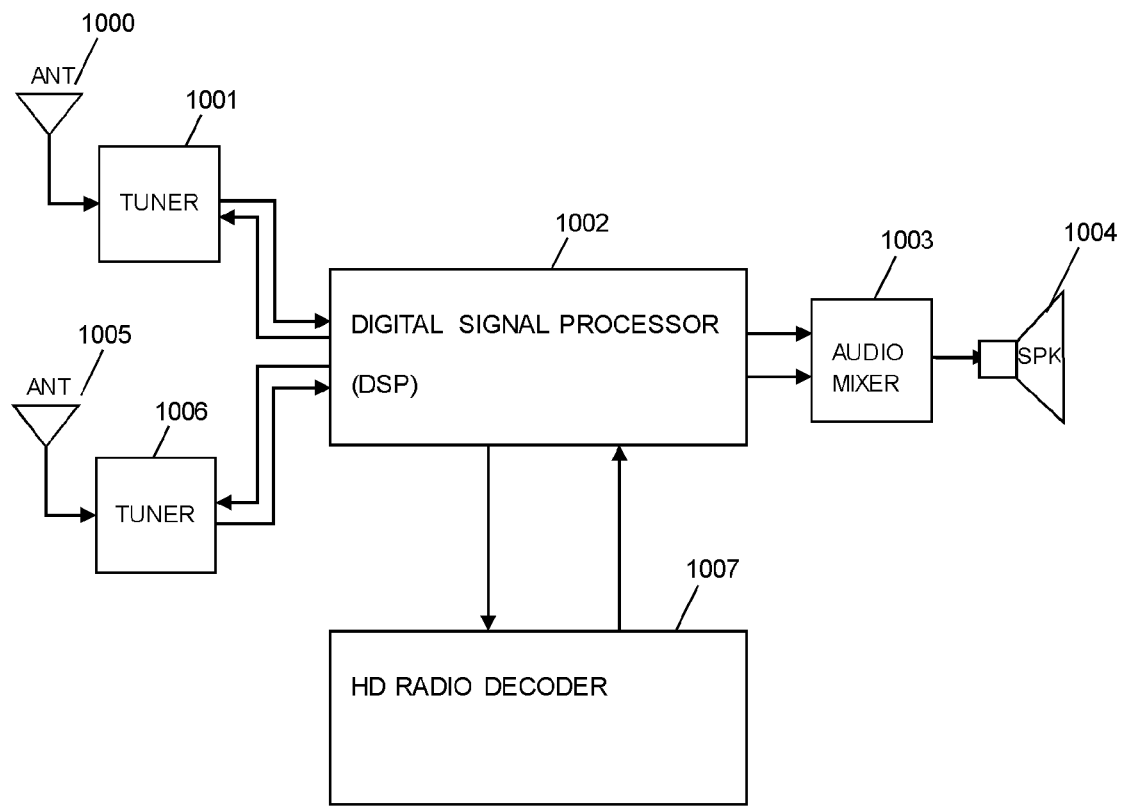
FIG. 10, illustrates the simultaneous receipt of normal broadcast programming content and alert content with dual tuners.

In another exemplary embodiment as illustrated in FIG. 10, normal broadcast programming content and alert can be received simultaneously with dual tuners. Tuner 1001 can receive normal broadcast programming content and Tuner 1006 can receive an alert content. An Alert Marker can be located slight ahead of the actual alert, allowing for synchronization discrepancy between broadcast stations and for additional processing time for smooth transition between the two streams such that a listener does not notice the transition. An Alert Marker can contain start time or delay time information for this purpose. In addition, more than one set Decoder 1007 or DSP 1002 can be used. Two audio streams can be mixed together by Audio Mixer 1003 to fade out one stream while fading in the other stream.

Receiving Alert by Analog Signal Switching

A method to replace a segment of analog broadcast programming content with an Alert Marker plus the alert content at the broadcaster side is provided. The method to render an alert from analog signal at the receiver side is also provided.

At the broadcaster side, the method comprises receiving digital or analog Alert Marker and digital or analog alert from a server through one or more communication networks such as satellite, microwave, radio wave and Internet. The method also comprises removing a portion of analog broadcast programming content and replacing it with an Alert Marker plus the actual alert content, transmitting the modified broadcast programming signal. In some embodiments, the digital broadcast programming content does not change and contains no alert content.

HD Radio signal blends both analog signal 105 and digital signal 106 of the same broadcast programming to create FM HD Radio broadcast signal (FIG. 2) or AM HD Radio broadcast signal (FIG. 3). In some embodiments, the digital signal can be referred to as a first radio channel, and the analog signal can be referred to as a second radio channel. Typically, when the digital signal fails on a receiver, the analog signal is used as a fallback. In one exemplary embodiment, an alert audio signal is mixed in analog signal 105 only. One Alert Marker, used to instruct a receiver to render analog signal, is inserted at the beginning of the alert. Another Alert Marker, used to instruct the receiver back to normal operation, is inserted at the end of the alert.

Figure 11:
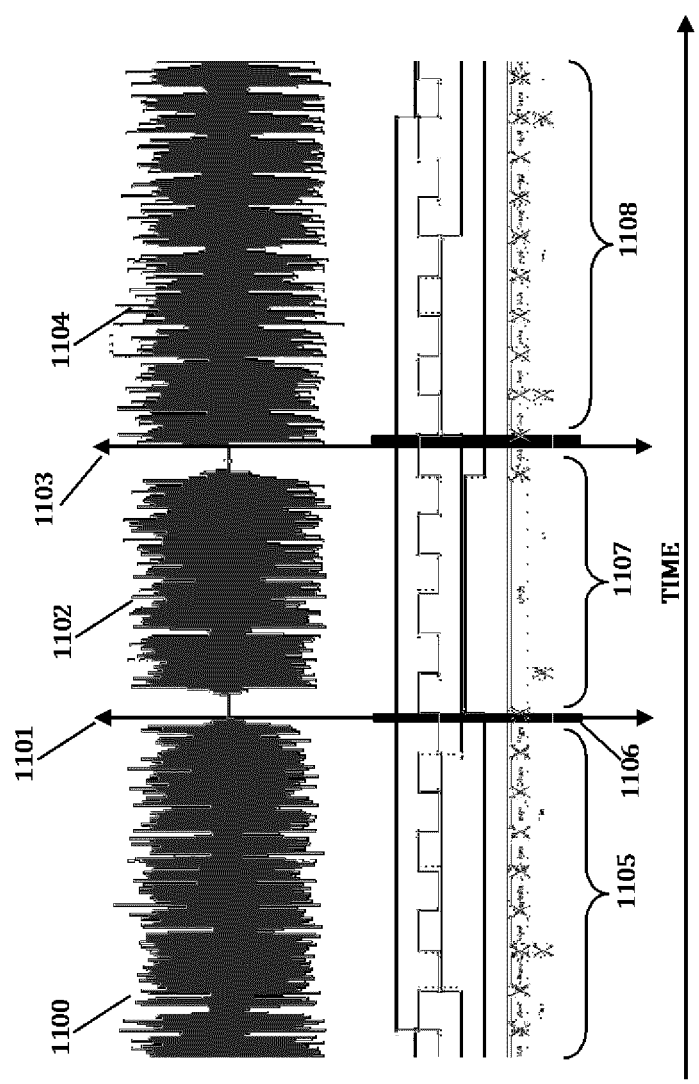
FIG. 11 illustrates a modified HD Radio signal where alert content is blended in with an analog signal.

FIG. 11 illustrates this modified HD Radio signal where an alert content 1102 is blended in with analog signal 1100, 1104. This process makes one portion of analog signal 1102 differ than the corresponding digital signal 1107. Analog Signal 1100 and 1104 are normal broadcast programming contents. Digital Signal 1105, 1107 and 1108 are all normal programming contents. Digital Signal 1105 and 1108 are the same broadcast programming content as of their counterparts, Analog Signal 1100 and 1104 respectively. Start Alert Marker 1101 and End Alert Marker 1103 indicate the beginning and the end of where the Analog and Digital signal are different. Also, they indicate the beginning and the end of an alert. If a receiver determines that Start Alert Marker 1101 satisfies a rendering condition, the receiver can ignore Digital Content 1107 and render Analog Content 1102. Without the preset of Start Alert Marker 1101, the digital content may have been rendered. If a receiver determines that Start Alert Marker 1101 fails to satisfy a rendering condition, Digital Content 1107 is rendered normally. However, if the Digital Content 1107 fails to render for any reason, Analog Content 1102, an alert content, can be rendered instead.

Figure 12:
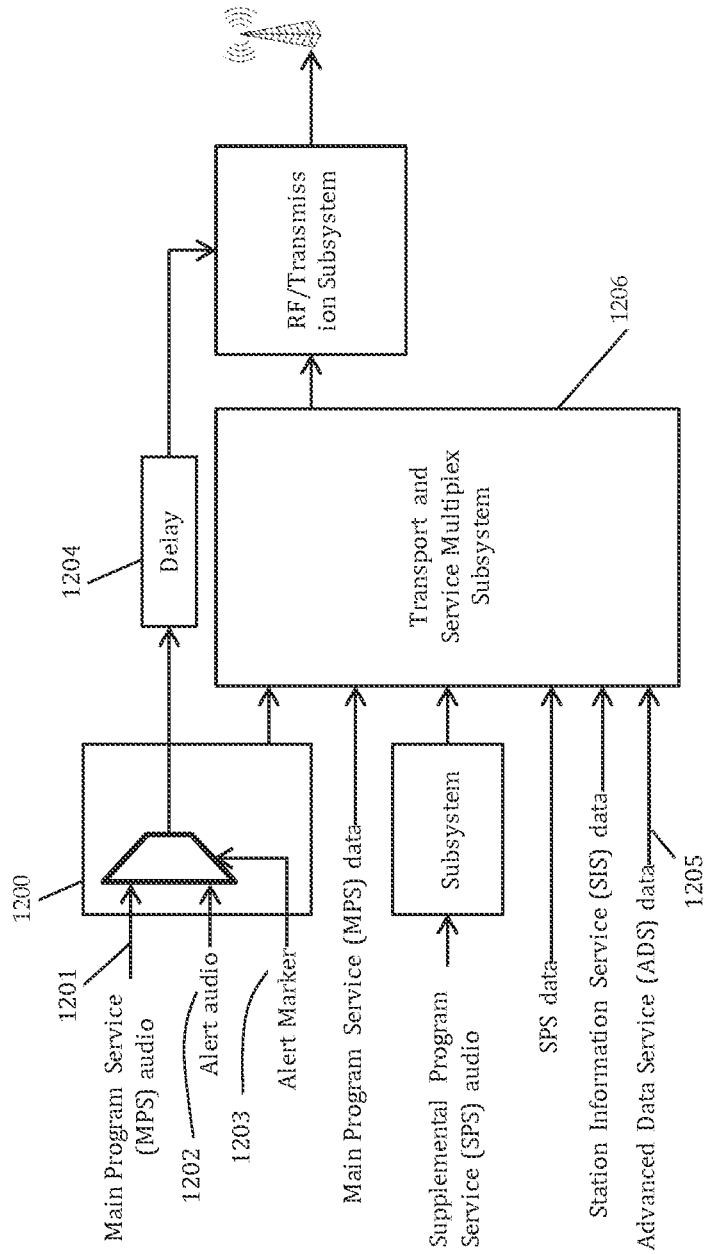
FIG. 12 illustrates an exemplary embodiment of an HD Radio system with two additional inputs.

FIG. 12 illustrates an exemplary embodiment of an HD Radio system with two additional inputs, Alert Signal 1202 and Alert Marker 1203, are added to Audio Subsystem 1200. Alert Marker 1203 input controls whether if Alert audio 1202 or normal programming audio 1201 is passed to Delay 1204. If the Alert Marker is a Start Alert Marker, Alert Audio 1202 is selected until an End Alert Marker is detected. Timeout period can be specified in a Start Alert Marker to provide a maximum time against an error. An End Alert Marker is a complement marker to a Start Alert Marker. It can contain exactly the same data except one bit to identify each other. Start Alert Marker and End Start Marker can also go to Transport and Service Multiplex Subsystem 1206 as ADS input 1205 to be embedded in the broadcast signal as described earlier.

At the receiver side, according to another exemplary embodiment, a HD Radio broadcast receiver for rendering an alert by switching to render analog signal is provided. The broadcast receiver comprises a user interface, a processing system, memory storage component and a tuner. The user interface comprises an input system for allowing user to select multiple types of alerts to be rendered. It can specify how to acknowledge that the user has been notified. An acknowledgement can be carried through Internet, email, texting. The processing system detect data of an Alert Marker within broadcast signal, determine whether the alert satisfies a rendering condition for alert, and if condition is satisfied, use the analog part of broadcast signal to render the alert, and if condition is not satisfied, use the digital part of the broadcast signal to render the original programming content. According to another exemplary embodiment, the above receiver can repeatedly render an alert.

Figure 13:
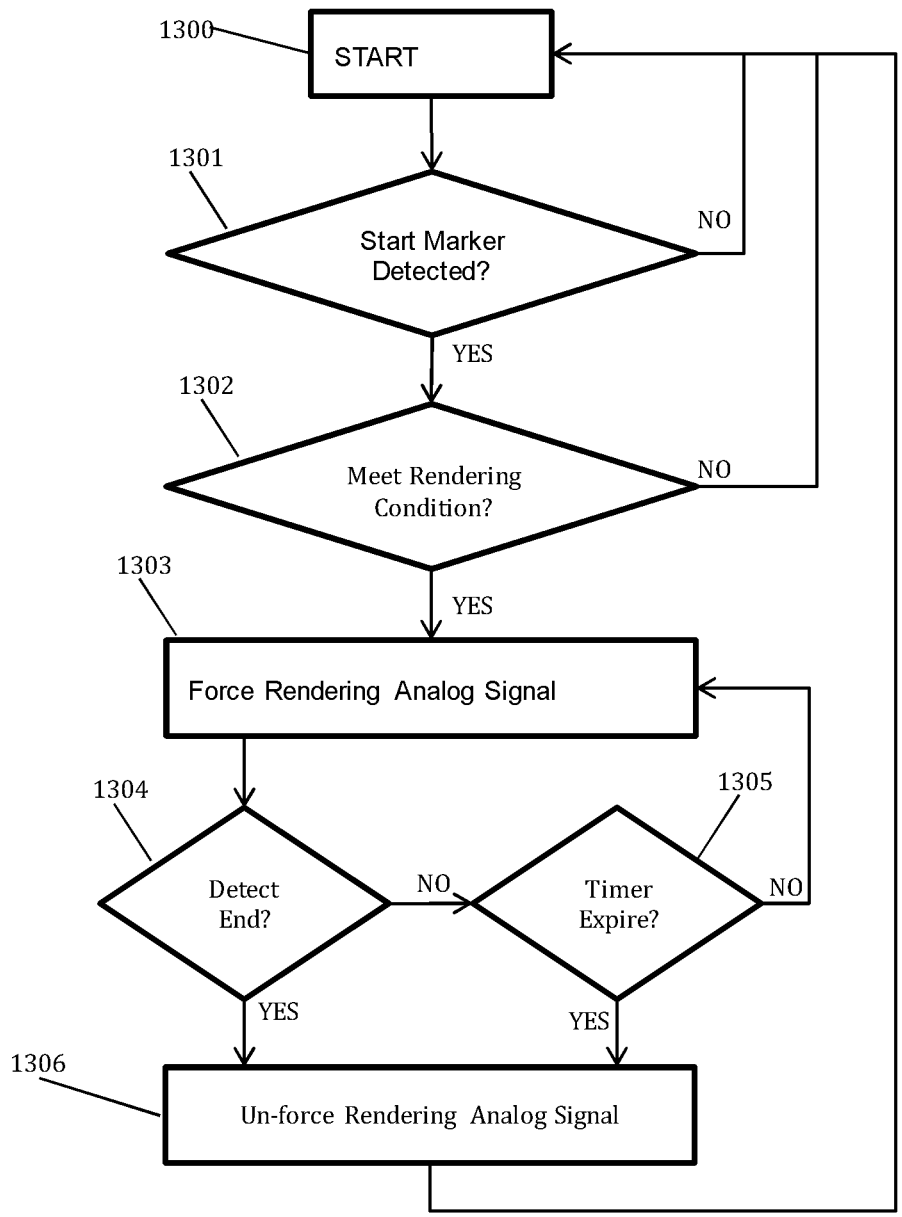
FIG. 13 is an exemplary embodiment of a HD Radio receiver's rendering of an alert illustrated in FIG. 11.

FIG. 13 is an exemplary embodiment of a HD Radio receiver's rendering an alert illustrated in FIG. 11. Block 1301 checks and waits for a Start Alert Marker. If it fails to detect a Start Alert Marker, it goes to Block 1300 and repeats the process again. When an Alert Marker is detected, Block 1302 determines if the Start Alert Marker satisfies a rendering condition. If it fails, the subsystem returns to block 1300 and repeats the process again. If it passes, the subsystem instructs the receiver to ignore digital broadcast signal and to render analog broadcast signal if the analog broadcast signal is available, as illustrated at Block 1303. If the analog broadcast signal is not available, the receiver continues to render the digital broadcast signal.

After detecting a Start Alert Marker, the subsystem proceeds to Block 1304 to detect the End Alert Marker that matches the Start Alert Marker previously detected in Block 1301. If the End Alert Marker is detected, the system instructs the receiver not to ignore the digital broadcast signal, as illustrated at Block 1306. If the End Alert Marker is not detected, the subsystem proceeds to Block 1305 to start the timer if the timer is zero or check the timer if it has expired. If the timer has not expired, the subsystem proceeds to loopback to Block 1303 and 1304 again. If the timer has expired, the system resets the timer back to zero and proceeds to Block 1306. After Block 1306, the subsystem can repeat the whole procedure again from the beginning.

Figure 14:
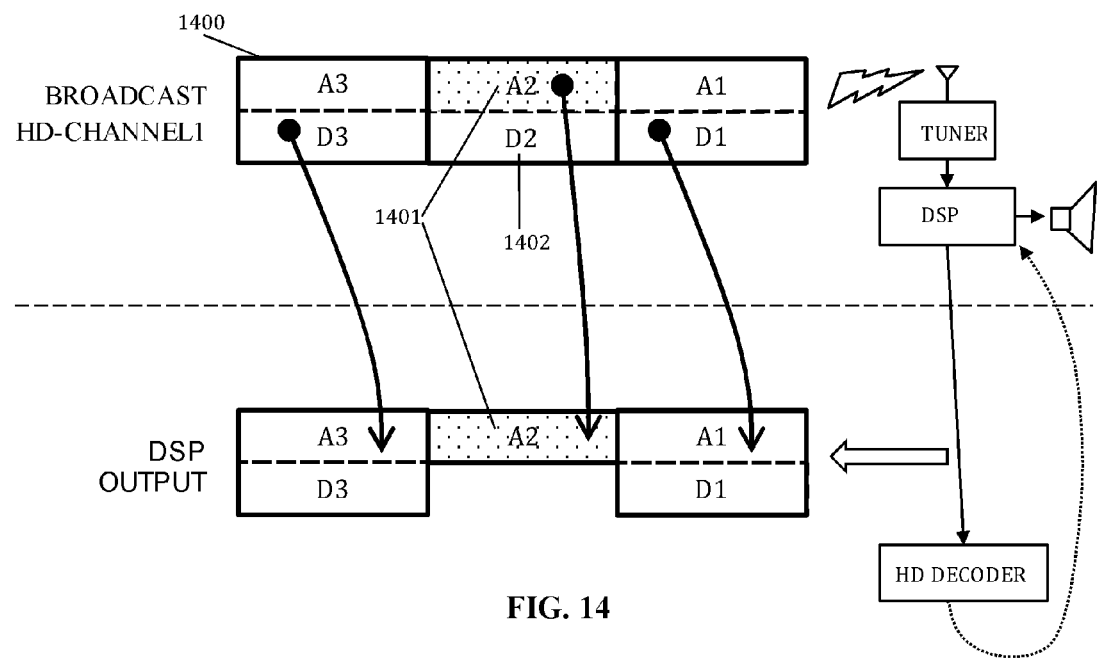
FIG. 14 illustrates a digital signal processor (DSP) in a receiver ignoring a digital signal and only rendering an analog signal.

FIG. 14 illustrates Digital Signal Processor (DSP) in a receiver ignoring Digital Signal (D2) 1402 and rendering Analog Signal (A2) 1401. 1400 is a HD Radio broadcast signal input to a receiver's DSP, similar to DSP 802 and DSP 1002. Element 1403 is a logical representation of DSP's output where Digital Signal (D2) 1402 is missing (ignored) and Analog Signal (A2) 1401 is rendered.

Skipping Alert by Channel Switching

A method to support legacy analog receiver and HD Radio receiver alongside the new receiver is provided. A segment of normal broadcast programming content is removed and replaced with an alert content on both analog signal and digital signal. The removed content segment is broadcasted on a different broadcast channel such that a listener can choose to skip an alert by continuing with the normal broadcast programming on this channel. After the end of the alert, the receiver switches back to the previous channel automatically.

At the broadcaster side, the method to replace a portion of HD Radio broadcast programming with an Alert Marker plus the alert content is also provided. The method comprises receiving digital or analog Alert Marker and digital or analog alert from a server through one or more communication networks such as satellite, microwave, radio wave and Internet. The method also comprises removing a portion of broadcast programming content and replacing it with an Alert Marker plus the alert content, transmitting the modified broadcast programming signal on one broadcast channel and the segment of broadcast programming content that is removed on another broadcast channel.

At the receiver side, a HD Radio broadcast receiver for replacing an alert with the original programming content is provided. The broadcast receiver comprises a user interface, a processing system, memory storage component and a tuner. The user interface comprises an input system for allowing user to select which of multiple types of alerts are to be rendered. It can provide information about how to acknowledge that the user has been notified. The acknowledgement can be carried through the Internet, email, texting, etc. The processing system can be configured to detect data of an Alert Marker within broadcast signal, determine whether the alert satisfies a condition for notifying, and if a condition is not satisfied, determine a corresponding broadcast channel where the original broadcast programming content can be found, cause the tuner to switch channel to said channel to receive the actual programming content instead of the alert, and switch the channel back to the original channel after the alert has passed.

This embodiment is similar to the Receiving Alert by Channel Switching embodiment, described previously, with an exception that the alert content segment and the removed broadcast content segment swap places with each other. In this embodiment, if an Alert Marker satisfies a rendering condition, no channel switching occurs. If an Alert Marker fails to satisfy a rendering condition, channel switching occurs to render the removed broadcast content on different broadcast channel.

Figure 15:
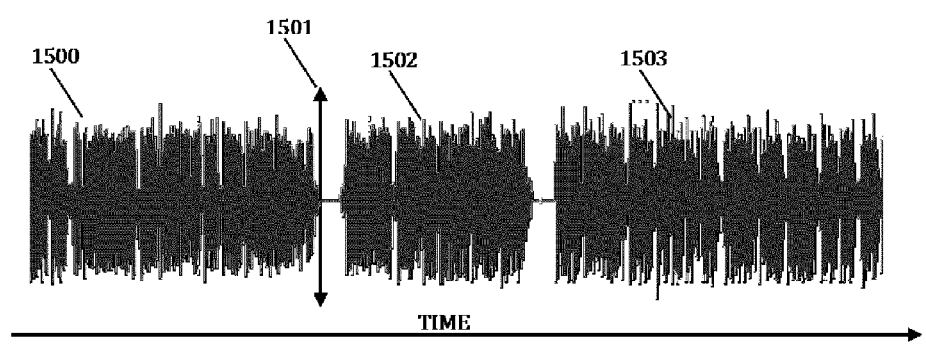
FIG. 15 illustrates an anti-Alert Marker.

In this and similar embodiments, the Alert Marker can also be appropriately referred to as an Anti-Alert Marker because it contains information used in skipping the alert. FIG. 15 illustrates an Anti-Alert Marker 1501. 1500 and 1503 are normal broadcast programming contents. 1502 is alert content. The segment of the broadcast programming content that is replaced by the alert content is found on a separate radio broadcast channel.

Skipping Alert by Analog Signal Switching

A method to replace a segment of digital broadcast programming content with an alert signal plus the actual alert at the broadcaster side is provided. The method to skip an alert from this Alert Marker at the receiver side is also provided.

At the broadcaster side, the method comprises receiving digital or analog Alert Marker and digital or analog alert from a server through one or more communication networks such as satellite, microwave, radio wave and Internet. The method also comprises removing a portion of digital broadcast programming content and replacing it with an Alert Marker plus the actual alert, transmitting the modified broadcast programming content. The analog signal does not contain an alert content.

At the receiver side, according to another exemplary embodiment, a HD Radio broadcast receiver for skipping an alert by switching to analog signal is provided. The broadcast receiver comprises a user interface, a processing system, memory storage component and a tuner. The user interface comprises an input system for allowing user to select multiple types of alerts to be rendered. It can provide information on how to acknowledge that the user has been notified. The acknowledgement can be carried out through the Internet, email, texting. The processing system configured to detect data of an Alert Marker within broadcast signal, determine whether the alert satisfies a rendering condition for alert, and if condition is satisfied, use the digital part of the broadcast signal to render the alert and if condition is not satisfied, use the analog part of broadcast signal to skip the alert and render the normal broadcast programming content.

This embodiment is similar to the Alert by Analog Signals Switching embodiment described previously, with an exception that the alert content and the removed broadcast content swap places with each other. In this embodiment, if an Alert Mark satisfies a rendering condition, no signal switching occurs. If an Alert Marker fails to satisfy a rendering condition, signal switching occurs from rendering digital signal to rendering analog signal. In this and similar embodiments, the Alert Marker can be appropriately referred to as an Anti-Alert Marker because it contains information used for skipping an alert.

Receiving Alert by Data Service

A method to send and receive an alert through a supplement data service in HD Radio broadcast signal is provided. The method to skip an alert from this Alert Marker at the receiver side is also provided.

At the broadcaster side, the method comprises receiving digital or analog Alert Marker and digital or analog alert from a server through one or more communication networks such as satellite, microwave, radio wave and Internet. The method also comprises adding an Alert Marker plus the alert content to broadcast signal through the supplemental data, and transmitting the modified broadcast programming signal.

At the receiver side, a HD Radio broadcast receiver for rendering an alert is provided. The broadcast receiver comprises a user interface, a processing system, memory storage component and a tuner. The user interface comprises an input system for allowing user to select which of multiple types of alerts are to be rendered. It can provide information about how to acknowledge that the user has been notified. The acknowledgement can be carried through the Internet, email, SMS, etc. The processing system configured to detect data of an Alert Marker within broadcast signal, determine whether the alert satisfies a condition for notifying, and if condition is satisfied, render an alert content by decoding the embedded alert data within the broadcast signal.

In an exemplary embodiment, an alert data is embedded into a HD Radio signal through Advanced Data Service (ADS) 104 port. An Alert Marker 501 can be used to mark and provide detail information about the alert. After detecting and decoding an alert, a HD Radio receiver determines if the alert satisfies a rendering condition. If a rendering condition is satisfied, it renders the alert content from appropriate embedded data within the broadcast signal.

Other Exemplary Embodiments

An alert can be distributed to one or more local alert distribution stations, such as a HD Radio station, though out a country by one or more satellites. Internet can be used as a backup to satellite. If a local alert distribution station does not have a satellite receiver, it can use the Internet to receive an alert.

In addition to receiving nation-wide alert, a local alert distribution center can receive a local alert from a local source such as local FEMA, Fire, Police, local AMER, local DHS, traffic, weather, utility company, or Fusion Center.

A local citizen or local business can send a request to broadcast an alert to a Fusion center which can verify, approve and certify and alert before forwarding it to local distribution stations.

A local alert distribution station can broadcast an alert with an Alert Marker that specifies a specific targeted area. For example, an Amber Alert can specify an area of 10 mile radius from a point of incident or sighting. In some embodiments, only people within this area can receive the alert.

Some benefits of the embodiments described herein include, but are not limited to: decreased or no programming interruption, receiver can automatically detect and determine relevance, all alerts available to the users (or subset as desired), support for both video and audio data, little to no program interruption, system can self-test, point-to-point distribution with redundant backup and requestable retransmission, which improves reliability, point-to-point digital relays, which maintains original audio quality, alerts can be stored for later access, flash vehicle directional signals, street lights, etc. for notification, can avoid the use of signaling tones, location can be entered or detected and used to filter irrelevant alerts, alerts can be provided for cable, TV, internet, vehicles in motion, handheld devices, etc.

Although described in terms of radio receivers, it will be understood that the alerts, Alert Markers, and alert content described herein can also be used in other areas, such as, but not limited to, television content and/or internet content. For example, the broadcast content described above can be television content. When an Alert Marker is decoded, the television set can automatically change to a different channel to receiver alert content and/or to continue watching the broadcast content. Similarly, alerts can be received via internet content. When an Alert Marker is detected, a computing device can automatically request a particular website that contains alert content and/or the original broadcast content, etc.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method, comprising:
   receiving broadcast content for a first radio channel of a radio receiver;
   causing an auditory device to present the broadcast content to a user;
   receiving an alert marker in the broadcast content indicating a type of alert and a coverage area of the alert;
   determining whether the alert is relevant to the user based at least on the type of alert and the coverage area, wherein upon determining that the alert is not relevant to the user, the auditory device continues to present the broadcast content to the user on the first radio channel; and
   upon determining that the alert is relevant to the user:
      automatically changing the radio receiver to a second radio channel,
      receiving alert content for the second radio channel,
      causing the auditory device to present the alert content to the user on the second radio channel,
      determining an end of the alert content, and
      automatically changing the radio receiver to the first radio channel upon determining the end of the alert content.

2. A method, comprising:
   receiving broadcast content for a first channel of a receiver;
   receiving an alert marker indicating a type of alert and a coverage area of the alert;
   determining, using one or more computer processors, that the alert is relevant to a user based at least on the type of alert and the coverage area;
   automatically changing the receiver to a second channel upon determining that the alert is relevant to the user;
   receiving alert content for the second radio channel;
   determining an end of the alert content; and
   automatically changing the receiver to the first channel upon determining the end of the alert content.

3. The method of claim 2, wherein the alert marker further indicates a size of the alert content, an identification of an originator of the alert, an alert priority level, a location of the second channel, a start time of the alert content, and end time of the alert content, a number of times the alert content is to be repeated, a beginning of the alert content, and an end of the alert content.

4. The method of claim 2, wherein the type of alert is selected from a plurality of types of alerts comprising mandatory alerts, local community alerts, county alerts, state alerts, country alerts, weather alerts, traffic alerts, Federal Emergency Management Agency (FEMA) alerts, Department of Homeland Security (DHS) alerts, American's Missing Broadcast Emergency Response (AMBER) alerts, fire alerts, police alerts, power outage alerts, and 911 alerts.

5. The method of claim 2, wherein the broadcast content comprises the alert marker.

6. The method of claim 2, wherein the broadcast content comprises digital broadcast content.

7. The method of claim 2, wherein the broadcast content comprises analog broadcast content.

8. The method of claim 2, further comprising receiving user preferences for the types of alert, wherein determining that the alert is relevant to the user is further based at least on the received user preferences.

9. The method of claim 2, wherein determining the end of the alert content comprises at least one of determining that all the alert content has been received and determining that a predetermined time threshold has been met.

10. The method of claim 2, wherein the broadcast content for the first channel continues to be received during receipt of the alert content for the second channel.

11. The method of claim 2, wherein the alert marker is a first alert marker, and further comprising:
   storing the alert content at the receiver;
   receiving a second alert marker; and
   repeating the stored alert content based at least on the receipt of the second alert marker.

12. The method of claim 2, further comprising:
   storing the alert content at the receiver; and
   repeating the alert content after a predetermined time threshold has been satisfied.

13. The method of claim 2, wherein one of the first channel and the second channel is an analog signal and the other of the first channel and the second channel is a digital signal.

14. The method of claim 13, wherein the second channel comprises the alert signal.

15. A device, comprising:
   an antenna configured to receive broadcast content for at least a first channel and receive alert content for at least a second channel;
   a tuner configured to select a channel from a plurality of channels from which to provide content to a user;
   a decoder configured to decode at least a portion of an alert marker received in the broadcast content and to determine a type of an alert and a coverage area of the alert; and
   one or more computer processors configured to:
      determine that the alert is relevant to a user based at least on the type of alert and the coverage area,
      automatically cause the tuner to select the second channel upon determining that the alert is relevant to the user,
      determine an end of the alert content, and
      automatically cause the tuner to select the first channel upon determining the end of the alert content.

16. The device of claim 15, further comprising a speaker configured to present content from the channel selected by the tuner to the user.

17. The device of claim 15, wherein the one or more computer processors are further configured to receive user preferences for the types of alert, and determines that the alert is relevant to the user based at least on the received user preferences.

18. The device of claim 15, wherein the broadcast content for the first channel continues to be received during receipt of the alert content for the second channel.

19. The device of claim 15, wherein the alert marker is a first alert marker, and further comprising:
   storing the alert content at the receiver;

receiving a second alert marker; and
repeating the stored alert content based at least on the receipt of the second alert marker.

20. The device of claim 15, wherein the one or more computer processors are further configured to:
store the alert content at the receiver; and
repeat the alert content after a predetermined time threshold has been satisfied.

\* \* \* \* \*